3,047,401
ALL-PURPOSE CULINARY OILS
Fredric J. Baur, Cincinnati, Ohio, assignor to The Procter & Gamble Company, Cincinnati, Ohio, a corporation of Ohio
No Drawing. Filed Nov. 2, 1959, Ser. No. 850,027
4 Claims. (Cl. 99—118)

This invention relates to all-purpose culinary oils. More particularly, it relates to fatty oils which are clear at temperatures normally encountered during storage in the kitchen, and which are suitable not only for salad oils but also for all normal baking and culinary uses with end results substantially equivalent to those obtained with conventional plastic shortenings and cooking oils.

Nearly all shortenings used today are glyceride fats in plastic form. At room temperature some 80%, more or less, of the composition of a typical plastic shortening is oil. The plasticity of the shortening is due to its content of solid glycerides, including from about 6% to about 20% of hardstock, or "stearin," which is usually composed of trisaturated triglycerides, but which may include some solid monoglycerides, diglycerides, other surface active materials, or other suitable fatty materials.

Although ordinary triglyceride plastic shortenings can be used for all cooking purposes in the home, processed plastic shortenings for use in cake baking, which provides an important test for shortening in the typical household, are "superglycerinated"; that is, they contain about one to about two percent of monoglycerides, along with some diglycerides, which bestow so-called "high-ratio" properties to the shortening, and permit the successful use (as judged by cake volume, cake grain or texture, and tenderness when eaten) of a high ratio of sugar to flour in cake making. Other surface active materials can also be added for this purpose. Plastic shortenings, of course, cannot be used for salad oils since a clear oil is necessary.

It is possible to disperse hardstock in an oil in such a crystalline condition that the hardstock does not give plastic body to the mass, but instead converts it to a more or less viscous pourable opaque liquid. U.S. Patent 2,815,286, Andre and Going, granted December 3, 1957, describes a pourable shortening in which normally solid glycerides are stably suspended in a liquid glyceride vehicle. This suspension has the convenience of being pourable, and thus is more easily dispensed, measured and mixed with other ingredients in making baked goods, both in commercial bakery practice and in household use. However, such an opaque suspension is too thick and viscous, and too grainy in appearance, to be useful where a clear oil is desired, as in salad oils, and thus, is not a truly all-purpose culinary oil.

Clear triglyceride oils have been used to some extent as shortenings. Certain special cake recipes have been developed which employ such oils instead of plastic shortening. However, these oils cannot be used in conventional cake recipes since batters made with the oils are unstable emulsions and will not hold the gases formed by air which has been incorporated by beating the batter or by the action of the baking leavening agents.

Although attempts have been made to find other additives which will impart all-purpose "high-ratio" properties to clear oil shortenings, no all-purpose clear culinary oil has been known which is free from objectionable features which stand in the way of widespread use.

It has now been found that a very satisfactory all-purpose clear culinary oil can be formed by dissolving certain long chain fatty acids in glyceride oil.

Accordingly, it is one of the objects of this invention to provide a clear oil suitable for all culinary uses.

It is a further object to provide a clear oil which can be used in baking cakes using conventional cake recipes.

Other objects and advantageous features will be apparent from the following detailed description.

An all-purpose clear culinary oil of this invention comprises a liquid glyceride vehicle in which is dissolved from about 1.0% to about 4.5%, by weight of shortening of unsaturated fatty acid having at least 20 carbon atoms. Such an oil will have a smoke point of at least 300° F. and can be maintained at a temperature as low as 40° F. for at least 10 hours without clouding. A preferred fatty acid is erucic acid.

The liquid glyceride oil which serves as a vehicle for the culinary oil of this invention should consist primarily of glycerides having melting points lower than about 40° to 45° F., so that the oil may be stored at refrigerator temperatures without clouding. It is, of course, desirable that the glyceride oil vehicle be chemically stable and resistant to oxidation.

Suitable glyceride vehicles may be derived from naturally occurring liquid glyceride oils such as corn oil, cottonseed oil, soybean oil, peanut oil, rapeseed oil, sesame seed oil, and sunflower seed oil. Refining, bleaching, winterizing and deodorizing of such oils may be desirable, and can be accomplished by means well known in the art. Also suitable as glyceride vehicles are liquid oil fractions obtained from palm oil, lard, and tallow, as, for example, by graining, or by directed interesterification followed by separation of the oil. Oils predominating in glycerides of unsaturated acids may require some hydrogenation to maintain flavor, but care should be taken not form too large an amount of solids melting about about 40° to 45° F. When oils are selected which have more of these solids than may be desirable, it will be necessary to remove the solids.

Suitable vehicles can also include certain triglycerides in which one or two of the hydroxyl groups of the glycerine are replaced by low molecular weight saturated fatty acid radicals including those of acetic, propionic, butyric, valeric, or caproic acids, and in which the remaining hydroxyl groups are replaced by acyl radicals of higher molecular weight saturated or unsaturated fatty acids having from 12 to 22 carbon atoms. For purposes of this invention such glycerides, containing both high and low molecular weight acid radicals, will be referred to hereinafter as low molecular weight synthetic fats. The low molecular weight synthetic fats selected must be liquid at 40° to 45° F. In order to resist oxidation and to prevent rancidity it is preferred to select low molecular weight synthetic fats in which there is present a minimum of high molecular weight polyunsaturated fatty acids. Normally liquid fatty acids of the oleic acid series, having a single carbon-to-carbon double bond, are satisfactory for this purpose.

The liquid glyceride vehicle also can be composed of mixtures of the above or similar oils.

As has been heretofore stated, the liquid glyceride vehicle itself is not suitable for use as a shortening for use in conventional cake recipes. A material added to improve the properties of the oil for baking use, without adversely affecting its performance as an all-purpose oil, must have the following qualifications.

(1) It must be capable of improving cake-making performance of the liquid glyceride vehicle.

(2) It must be sufficiently soluble in the liquid glyceride vehicle that it will not form crystals at temperatures of 40° to 45° F. when added in sufficient amount to provide satisfactory emulsifying properties in cake batters.

(3) It must have a sufficiently high smoke point that the clear oil can be used for frying.

Conventional mono- and diglyceride emulsifiers have been found not to have sufficient solubility in oils so as to provide a clear liquid product when used at concentration levels necessary to provide a satisfactory cake shortening. Saturated fatty acids also do not have sufficient solubility in oils to be suitable for shortenings of this invention.

As will be shown by the following data, unsaturated fatty acids having at least 20 carbon atoms are very suitable for use in clear oil shortenings. For purposes of illustration erucic acid is used as an example. However, it is to be understood that other unsaturated fatty acids having at least 20 carbon atoms, including gadoleic, selacholeic, arachidonic, and clupanodonic acids, can be used instead of or in combination with erucic acid.

A comparison of the solubility of various additives is shown in the following Table I which lists the results of adding fatty acids and conventional plastic shortening emulsifier in indicated amounts to refined, bleached, and winterized cottonseed oil. The test comprised dissolving the additive in 50 g. of oil in 4 oz. bottles and placing the bottles in water in a room in which the temperature was held constant at 32° F. The time elapsed until the clear oil became cloudy was measured. Satisfactory salad oils should not become cloudy under such conditions in less than 5 hours.

TABLE I

*Clouding Time*

| Amount, Percent | Additive | Time to Cloud at 32° F. (Hrs.) |
|---|---|---|
| 1 | (Control) | ca. 17 |
| 1 | Palmitic acid | 7 |
| 5 | do | 1 0 |
| 1 | Mixture containing about 40% mono-40% di-, and 20% triglyceride of partially hydrogenated cottonseed oil. | 0.5 |
| 5 | do | 1 0 |
| 1 | Behenic acid | 1 0 |
| 1 | Erucic acid | ca. 17 |
| 5 | do | 0.5 |

[1] These samples began to cloud at room temperature.

These data show that the addition of any of the listed materials at a level of 5 percent will form a product unsatisfactory for use as a salad oil. Both behenic acid and the mixture of mono-, di- and triglycerides made by "superglycerination" of cottonseed oil formed crystals at a level as low as 1 percent. 1% of erucic acid remained in solution for more than 17 hours, after which period of time the test was terminated.

Although unsaturated fatty acids having less than 20 carbon atoms will dissolve in oil, thereby being suitable for use in clear salad oils, it has been found that the presence of such fatty acids will cause the oil to smoke at undesirably low temperatures. A smoke point of less than about 300° F. is considered very undesirable in an all-purpose oil which is to be used for frying.

The following Table II shows the smoke points of various clear oils formed by adding fatty acids to refined, bleached, and winterized cottonseed oil in indicated amounts. Also included in the test was oil to which had been added varying amounts of rapeseed fatty acids. These were made by saponifying rapeseed oil with an alcoholic potash solution, acidulating with a mineral acid, and extracting the fatty acids with a solvent. The smoke point measurement was made by using American Oil Chemists' Society Method Cc 9a–48, revised November 1948. In this test a sample of oil or melted fat is heated under controlled conditions. The smoke point is the temperature at which the sample begins to give off a thin, continuous stream of bluish smoke. In some cases the results are shown for two separate tests.

TABLE II

*Smoke Point (° F.)*

| Additive (Percent in Oil) | Stearic Acid | Palmitic Acid | Oleic Acid | Erucic Acid | Rapeseed Fatty Acids |
|---|---|---|---|---|---|
| 0.1 | 400 | 390 | | | |
| 0.13 | | | | 430 | 427 |
| 0.5 | 345 | 346, 332 | 334 | | |
| 0.6 | | | | | 380 |
| 1.0 | 322, 330 | 300, 305 | 300, 320 | 360, 365 | |
| 1.3 | | | | 380 | 360 |
| 1.5 | [1] 298 | 300 | 285 | | |
| 2.0 | | [1] 270, [1] 269 | | 335 | |
| 2.4 | | | | | 330 |
| 2.5 | [1] 288 | [1] 263 | 289 | | |
| 2.65 | | | | 355 | |
| 3.0 | | | | 325 | |
| 5.0 | [1] 275 | [1] 256, [1] 255 | | | |
| 6.05 | | | | | 300 |
| 6.6 | | | | 325 | |

[1] Formed a cloud in oil at room temperature.

The cake baking qualities of clear oil shortenings of this invention are shown by the following examples which represent the preparation of cakes by conventional recipes and procedures.

EXAMPLE I

A dry premix was prepared by sifting together the following ingredients and then thoroughly blending the mixture in an electric mixer, using a wire whip at low speed for 15 minutes:

```
                                                        G.
Cake flour _____ 1711
Sugar _____ 2135
Salt _____   48
Baking powder _____  106
```

250 g. portions of this mixture were placed in a bowl and 55 g. portions of refined, bleached, and winterized cottonseed oil with added acid were added to each bowl together with 90 g. of milk and mixed for two minutes with an electric mixer running at medium speed. 60 g. of egg white, 40 g. of milk and ½ teaspoon of vanilla extract were then added to each portion. A batter made with 50 g. of "Crisco," a commercial plastic shortening, was used as a control. Each of the batters was baked in an 8-inch round cake pan for about 30 minutes at 350° F. The following cake results were noted.

```
                                              Cake volume
Shortening:                                     (cc./lb.)
    (a) Commercial plastic cake shortening ____ 1217
    (b) Oil (no additive) _____  909
    (c) Oil containing 3% erucic acid _____ 1109
    (d) Oil containing 3% oleic acid _____  981
```

The texture and grain of the cakes (a) and (c) were comparable. Cakes (b) and (d) were heavy, contained many large voids, and had a sponge-like consistency.

Other suitable glyceride vehicles, as hereinbefore defined can be substituted in the above formula to produce comparable cakes.

EXAMPLE II

A flour premix was prepared by blending together 18 parts of baking powder with 250 parts of flour. A milk solution was prepared by dissolving 280 parts of powdered milk in 2268 parts of water. A salted milk solution was prepared by adding salt to the milk solution in the ratio of 19 g. of salt per 1000 cc. of milk solution. Cake batters were prepared by mixing together 139 parts of flour premix, 174 parts of sugar, 65 parts of oil shortening and 142 parts of salted milk solution for 2 minutes and then adding 72 parts of egg whites, 3 parts of vanilla and 58 parts of milk solution and stirring for two additional minutes. A 400 g. portion of each batter was baked for 27 to 30 minutes at 375° F. in an 8-inch circular pan.

The following table shows the volumes of cakes obtained by use of shortenings which consisted of refined, bleached, and winterized cottonseed oil containing varying amounts of erucic acid.

Shortening: Cake volume (cc./lb.)
- Oil (no fatty acid) _____ 865
- Oil containing 1.0% erucic acid _____ 1065
- Oil containing 1.5% erucic acid _____ 1110
- Oil containing 2.0% erucic acid _____ 1110
- Oil containing 2.5% erucic acid _____ 1120
- Oil containing 3.0% erucic acid _____ 1065

The texture and eating quality of all of the cakes made from the erucic acid shortenings were good. Other types of cakes such as chocolate, yellow, and spice of comparable quality can also be made using shortenings containing erucic acid dissolved in cottonseed oil. In addition, as has been previously pointed out, other unsaturated fatty acids containing at least 20 carbon atoms can be substituted for all or part of the erucic acid in the clear oils with comparable baking results and salad oil and frying performance.

The fatty acids derived from natural oils which are high in unsaturated fatty acids containing at least 20 carbon atoms can be used as additives to clear oils to form shortenings of this invention. However, it is possible that other materials may be present which will not dissolve in the oil vehicle or which would cause the oil to have too low a smoke point. Accordingly, care should be taken in selecting amounts of mixtures of fatty acids from natural oils to avoid those which will not provide a suitable all-purpose shortening.

Rapeseed oil, which contains about 30% to 50% combined erucic acid is a very satisfactory source of fatty acids for use in clear oils of this invention. However, the presence of other acids may cause larger amounts of the mixture of rapeseed oil fatty acids to be unsatisfactory. Accordingly, it is preferred to use an amount of rapeseed fatty acids containing from about 1.0% to about 2.5% by weight of the oil, of erucic acid, dissolved in the glyceride vehicle. The following Example III shows baking results for white and yellow cakes using rapeseed oil fatty acids dissolved in a clear oil.

EXAMPLE III

*White cake.*—A flour premix was prepared by blending together 18 parts of baking powder and 250 parts of cake flour. A milk solution was prepared by dissolving 112 parts of milk powder in 907 parts of water. A salted milk solution was prepared by adding 4 parts of salt to the milk solution. Cake batters were prepared by mixing together 27 parts of the flour premix, 33 parts of sugar, 13 parts of shortening and 22 parts of salted milk solution for 100 seconds, and then adding 14 parts of egg white, 1 part of vanilla and 11 parts of milk solution and stirring for an additional 100 seconds.

*Yellow cake.*—A flour premix was prepared by blending together 15 parts of baking powder with 250 parts of flour. Cake batters were prepared by mixing together 27 parts of the flour premix, 33 parts of sugar, 13 parts of shortening and 22 parts of the same salted milk solution which was used in the white cake batters, for 100 seconds, and then adding 120 parts of whole egg, 1 part of vanilla, and 11 parts of the milk solution used for the white cake batter, and stirring for an additional 100 seconds.

The shortenings used in these batters were refined, bleached, and winterized cottonseed oil containing rapeseed oil fatty acids in the indicated amounts. The fatty acid mixture was prepared by the conventional method of saponifying rapeseed oil with an alcoholic potash solution, acidulating with a mineral acid, and extracting the fatty acids with a solvent.

The following table shows the comparative volumes of cakes baked from these batters.

| Shortening | Cake Volume (cc.) | |
| --- | --- | --- |
| | White Cake | Yellow Cake |
| Oil | 175 | 248 |
| Oil containing 1% rapeseed F.A | 162 | 267 |
| Oil containing 3% rapeseed F.A | 186 | 258 |
| Oil containing 5% rapeseed F.A | 191 | 252 |

Although cottonseed oil has been used in the test of the examples, it is to be understood that comparable results can be obtained by using any other suitable glyceride vehicles, such as those heretofore specified.

It may be desirable, especially in culinary oils containing larger amounts of unsaturated fatty acids, to add a small amount of some material which will tend to inhibit the formation of fat crystals. Materials suitable for this purpose include vegetable oils, such as soybean oil, or cottonseed oil, which have been substantially completely hydrogenated and partially oxidized.

As has been shown, the presence of unsaturated fatty acids having at least 20 carbon atoms dissolved in a clear glyceride oil will result in an improvement in the cake-baking ability of the oil, and thus enable such an oil to be used for an all-purpose culinary oil. Such an oil is capable of being stored in a refrigerator at 40° to 45° F. without becoming cloudy, and can also be used for frying without producing an objectionable amount of smoke when heated to temperatures in excess of about 300° F.

What is claimed is:

1. An all-purpose clear culinary oil comprising a liquid glyceride vehicle in which is dissolved from about 1.0% to about 4.5%, by weight of oil, of erucic acid, said oil having a smoke point of at least 300° F. and capable of being maintained at a temperature as low as 40° F. for at least 10 hours without clouding.

2. An all-purpose clear culinary oil comprising a liquid glyceride vehicle in which is dissolved a mixture of fatty acids, derived from rapeseed oil in an amount containing from about 1.0% to about 2.5%, by weight of oil, of erucic acid, said oil having a smoke point of at least 300° F. and capable of being maintained at a temperature as low as 40° F. for at least 10 hours without clouding.

3. The method of making an all-purpose clear culinary oil which comprises dissolving in a liquid glyceride vehicle from about 1.0% to about 4.5%, by weight of oil, of erucic acid.

4. The method of making an all-purpose clear culinary oil which comprises dissolving in a liquid glyceride vehicle a mixture of fatty acids derived from rapeseed oil in an amount containing from about 1.0% to about 2.5%, by weight of oil, of erucic acid.

References Cited in the file of this patent

UNITED STATES PATENTS

| | | |
| --- | --- | --- |
| 2,721,803 | Ginn et al. | Oct. 25, 1955 |
| 2,815,286 | Andre et al. | Dec. 3, 1957 |
| 2,875,065 | Thompson | Feb. 24, 1959 |

OTHER REFERENCES

"The Use of Solid Triglyceride Stearines as Fluid Shortening Ingredients," by Linteris et al., The Journal of the American Oil Chemists' Society, vol. 35, January 1958, pp. 28–32.